US012668273B2

(12) United States Patent
Huang et al.

(10) Patent No.: US 12,668,273 B2
(45) Date of Patent: Jun. 30, 2026

(54) HIERARCHICAL PLANNING THROUGH GOAL-CONDITIONED OFFLINE REINFORCEMENT LEARNING

(71) Applicants: DENSO International America, Inc, Southfield, MI (US); THE REGENTS OF THE UNIVERSITY OF CALIFORNIA, Oakland, CA (US)

(72) Inventors: Minglei Huang, Novi, MI (US); Wei Zhan, Berkeley, CA (US); Masayoshi Tomizuka, Berkeley, CA (US); Chen Tang, Berkeley, CA (US); Jinning Li, Berkeley, CA (US)

(73) Assignees: DENSO International America, Inc, Southfield, MI (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 100 days.

(21) Appl. No.: 18/439,222

(22) Filed: Feb. 12, 2024

(65) Prior Publication Data

US 2024/0336277 A1 Oct. 10, 2024

Related U.S. Application Data

(60) Provisional application No. 63/458,299, filed on Apr. 10, 2023.

(51) Int. Cl.
*B60W 60/00* (2020.01)
*G06V 20/56* (2022.01)
(52) U.S. Cl.
CPC .......... *B60W 60/001* (2020.02); *G06V 20/56* (2022.01)

(58) Field of Classification Search
None
See application file for complete search history.

(56) References Cited

U.S. PATENT DOCUMENTS

2021/0187733 A1* 6/2021 Lee ........................ G06N 3/008
2021/0341904 A1* 11/2021 Woehlke ............. G05D 1/0221
(Continued)

OTHER PUBLICATIONS

H. Nguyen, H. M. La and M. Deans, "Hindsight Experience Replay With Experience Ranking," 2019 Joint IEEE 9th International Conference on Development and Learning and Epigenetic Robotics (ICDL—EpiRob), Oslo, Norway, 2019, pp. 1-6 (Year: 2019).*
(Continued)

*Primary Examiner* — Vivek D Koppikar
*Assistant Examiner* — David Ruben Pedersen
(74) *Attorney, Agent, or Firm* — Harness, Dickey & Pierce, P.L.C.

(57) ABSTRACT

A method and system for controlling a device includes training a low-level policy to form a trained low-level policy and a low-level value function to form a trained goal conditioned value function, wherein training is performed using a static data set using goal conditioned episodes, training a high-level goal planner having high level goals having high-level sub-goals corresponding to a plurality of future time steps using the low-level value function to maximize a cumulative reward over the sub-goals for the plurality of future time steps so that the sub-goals are reachable by the low-level policy, obtaining an observation of a device, and generating an executable action using the low-level policy and the high-level goal planner and operating the device with the executable action.

20 Claims, 10 Drawing Sheets

(56)          References Cited

U.S. PATENT DOCUMENTS

2021/0398014 A1 * 12/2021 Cao ........................... G06N 7/01
2022/0055689 A1 * 2/2022 Mandlekar ........ B60W 60/0025

OTHER PUBLICATIONS

S. Kumar, A. Kumar, S. Levine, C. Finn, "One Solution is Not All You Need: Few-Shot Extrapolation via Structured MaxEnt RL," arXiv:2010.14484v2 pp. 1-20, Dec. 7, 2020 (Year: 2020).*
J.Fu,A.Kumar,O.Nachum,G.Tucker,andS.Levine, "D4rl: Datasets for deep data-driven reinforcement learning," 2020.
S. Levine, A. Kumar, G. Tucker, and J. Fu, "Offline reinforcement learning: Tutorial, review, and perspectives on open problems," arXiv preprint arXiv:2005.01643, 2020.
A. Kumar, A. Zhou, G. Tucker, and S. Levine, "Conservative q-learning for offline reinforcement learning," arXiv preprint arXiv:2006.04779, 2020.
J. Li, C. Tang, M. Tomizuka, and W. Zhan, "Dealing with the unknown: Pessimistic offline reinforcement learning," in Conference on Robot Learning, pp. 1455-1464, PMLR, 2022.
S. Sinha, A. Mandlekar, and A. Garg, "S4rl: Surprisingly simple self-supervision for offline reinforcement learning in robotics," in Proceedings of the 5th Conference on Robot Learning (A. Faust, D. Hsu, and G. Neumann, eds.), vol. 164 of Proceedings of Machine Learning Research, pp. 907-917, PMLR, Nov. 8-11, 2022.
A. Kumar, A. Singh, S. Tian, C. Finn, and S. Levine, "A workflow for offline model-free robotic reinforcement learning," arXiv preprint arXiv:2109.10813, 2021.
A. Singh, A. Yu, J. Yang, J. Zhang, A. Kumar, and S. Levine, "Cog: Connecting new skills to past experience with offline reinforcement learning," arXiv preprint arXiv:2010.14500, 2020.
T. G. Dietterich et al., "The MAXQ method for hierarchical reinforcement learning.," in ICML, vol. 98, pp. 118-126, Citeseer, 1998.
O. Nachum, S. S. Gu, H. Lee, and S. Levine, "Data-Efficient Hierarchical Reinforcement Learning," $32_{nd}$ Conference on Neural Information Processing Systems (NIPS 2018), arXiv:1805.08296v4 [cs.LG], Oct. 5, 2018.
J. Li, L.Sun, J.Chen, M.Tomizuka, and W.Zhan, "A safe hierarchical planning framework for complex driving scenarios based on reinforcement learning," in 2021 IEEE International Conference on Robotics and Automation (ICRA), pp. 2660-2666, IEEE, 2021.
S. Nasiriany, V. H. Pong, S. Lin, and S. Levine, "Planning with goal-conditioned policies," arXiv preprint arXiv:1911.08453, 2019.
L. P. Kaelbling, "Learning to achieve goals," in In Proc. of IJCAI—93, pp. 1094-1098, Morgan Kaufmann, 1993.
T. Schaul, D. Horgan, K. Gregor, and D. Silver, "Universal value function approximators," in Proceedings of the 32nd International Conference on Machine Learning (F. Bach and D. Blei, eds.), vol. 37 of Proceedings of Machine Learning Research, (Lille, France), pp. 1312-1320, PMLR, Jul. 7-9, 2015.
A. Punjani and P. Abbeel, "Deep learning helicopter dynamics models," in 2015 IEEE International Conference on Robotics and Automation (ICRA), pp. 3223-3230, IEEE, 2015.
F. Berkenkamp, M. Turchetta, A. Schoellig, and A. Krause, "Safe model-based reinforcement learning with stability guarantees," Advances in neural information processing systems, vol. 30, 2017.
M. Andrychowicz, F. Wolski, A. Ray, J. Schneider, R. Fong, P. Welin-der, B. McGrew, J. Tobin, O. Pieter Abbeel, and W. Zaremba, "Hind-sight experience replay," Advances in neural information processing systems, vol. 30, 2017.
K. Sohn, H. Lee, and X. Yan, "Learning structured output representation using deep conditional generative models," Advances in neural information processing systems, vol. 28, 2015.
M. Janner, J. Fu, M. Zhang, and S. Levine, "When to trust your model: Model-based policy optimization," Advances in Neural Information Processing Systems, vol. 32, 2019.
Y. Ding, C. Florensa, M. Phielipp, and P. Abbeel, "Goal-conditioned imitation learning," CoRR, vol. abs/1906.05838, 2019.

* cited by examiner

212 Obtain static offline data

214 Train low level goal-conditioned RL policy

216 Train high level goal planning module

218 Obtain environment observations

220 Control the vehicle to attain goal by performing executable actions

Algorithm 1: Training Procedure of Hierarchical Goal-Conditioned Offline Reinforcement Learning.

1 Initialize: A Q-network $Q_\theta$ parametrized by $\theta$, A target network $Q_{\bar\theta} = Q_\theta$ parametrized by $\bar\theta$, a policy network $\pi_\varphi$ parametrized by $\varphi$, an encoder $E_\mu$ and a decoder $D_\nu$ for the CVAE, a training dataset $D$;

2 for *step c in range(0, C)* do

3     Sample a batch of $b$ states s from the dataset D;

4     Update $\mu$ and $\nu$ according to the CVAE objective;

5 end

6 for step *m in range(0, M)* do

7     Sample a pair $(s^k_{t_{i,j}}, a^k_{t_{i,j}}, s^k_{t_{i,j+1}}, r^k_{env,t_{i,j}})$ ;

8     Sample a future state $s^k_T$ within the *k*-th trajectory and add noise with a probability $n$ to obtain the goal $g_{t_{j+1}} = D_\nu(E_\mu(s^k_T) + \varepsilon, s^k_{T-N})$;

9     Relabel the reward following Eqn. (5);

10     Update $Q_\theta$ with the CQL policy evaluation step and learning rate $\varepsilon_\theta$: $\theta_m \leftarrow \theta_{m-1} + \varepsilon_\theta \nabla_\theta J(\theta)$;

11     Update $\pi_\varphi$ according to the soft actor-critic style objective and learning rate $\varepsilon_\varphi$:

$$\varphi_m \leftarrow \varphi_{m-1} + E_{s\sim d^{\pi\beta}(s), a\sim\pi_\varphi(a)}[Q_\theta(s, a, g) - \log\pi_\varphi(a|s,g)];$$

12     if *m mod target_update == 0* then

13        Soft Update the target network $\bar\theta_m \leftarrow (1-\tau)\bar\theta_{m-1} + \tau\theta_{m-1}$ 14     end

15 end

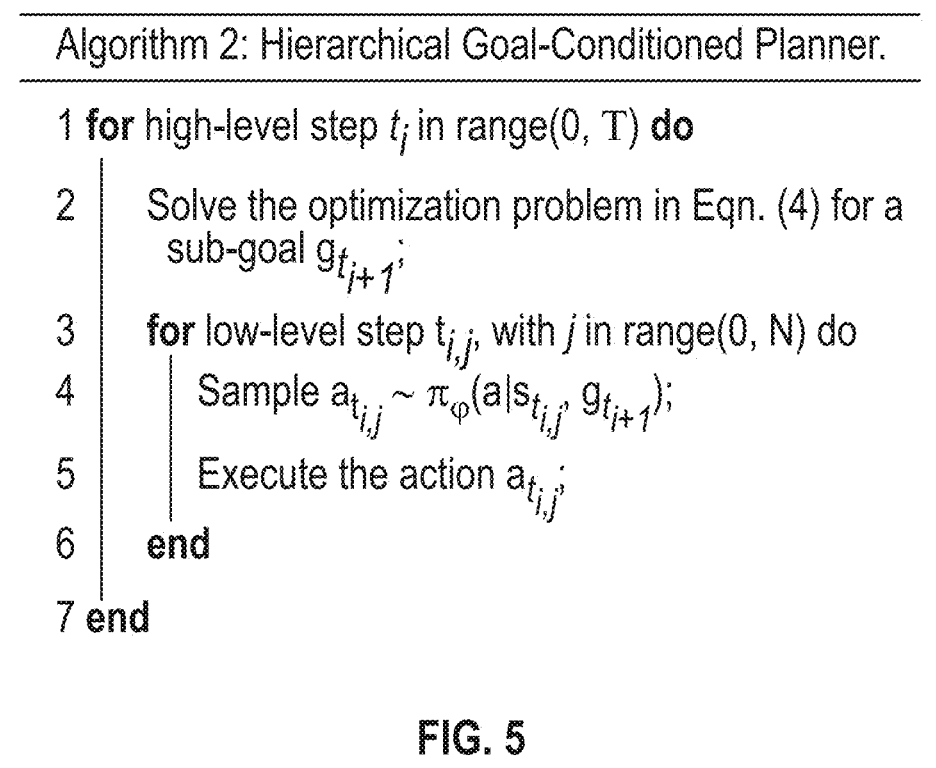

Algorithm 2: Hierarchical Goal-Conditioned Planner.

---

1 for high-level step $t_j$ in range(0, T) do

2　　Solve the optimization problem in Eqn. (4) for a sub-goal $g_{t_{j+1}}$;

3　　for low-level step $t_{i,j}$, with $j$ in range(0, N) do

4　　　　Sample $a_{t_{i,j}} \sim \pi_\varphi(a|s_{t_{i,j}}, g_{t_{j+1}})$;

5　　　　Execute the action $a_{t_{i,j}}$;

6　　end

7 end

FIG. 5

Normalized Scores of All Variants when Trained with the "Medium" and "Expert" Quality Dataset in the Local Map

| Dataset | Look-ahead | HiGoC-0.4s | HiGoC-2.0s | HiGoC-no noise | IRIS | CQL |
|---------|-----------|-----------|-----------|----------------|------|-----|
| Medium | 1-step | 93.5 ± 9.4 | 98.4 ± 10.3 | 90.8 ± 6.9 | 83.3 ± 5.3 | 88.7 ± 6.3 |
| | 3-step | 93.7 ± 10.1 | 95.5 ± 11.4 | 91.2 ± 9.8 | 87.2 ± 4.5 | - |
| | 5-step | 96.2 ± 13.5 | 94.9 ± 10.2 | 95.5 ± 14.7 | 91.5 ± 3.1 | - |
| | 7-step | 99.4 ± 12.9 | 92.7 ± 15.8 | 93.1 ± 13.3 | 90.1 ± 7.8 | - |
| Expert | 1-step | 92.8 ± 6.5 | 97.4 ± 7.2 | 93.4 ± 6.9 | 84.1 ± 4.7 | 90.5 ± 4.1 |
| | 3-step | 94.2 ± 6.8 | 96.5 ± 7.7 | 93.7 ± 7.3 | 92.3 ± 6.0 | - |
| | 5-step | 97.9 ± 8.1 | 95.8 ± 9.4 | 94.6 ± 8.1 | 87.5 ± 5.2 | - |
| | 7-step | 98.4 ± 9.4 | 91.6 ± 11.1 | 95.3 ± 10.5 | 89.9 ± 4.8 | - |

FIG. 7

The Performance in the Whole Town Map

| Dataset | Variants | Normalized Score | Collision Rate |
|---|---|---|---|
| Medium | HiGoC-7step | $54.2 \pm 9.7$ | 0.32 |
| | HiGoC-1step | $45.5 \pm 8.5$ | 0.38 |
| | IRIS-7step | $43.3 \pm 7.1$ | 0.40 |
| | CQL | $31.1 \pm 8.3$ | 0.45 |
| Expert | HiGoC-7step | $61.6 \pm 8.4$ | 0.23 |
| | HiGoC-1step | $47.5 \pm 7.9$ | 0.32 |
| | IRIS-7step | $48.2 \pm 8.7$ | 0.33 |
| | CQL | $37.4 \pm 6.2$ | 0.36 |

FIG. 8

Normalized Scores on Antmaze Environments

| Env | CQL | OPAL | IRIS | HiGoC |
|---|---|---|---|---|
| umaze | 74.0 | - | $82.6 \pm 4.7$ | $85.3 \pm 2.1$ |
| umaze-diverse | 84.0 | - | $89.4 \pm 2.4$ | $91.2 \pm 1.9$ |
| medium-play | 61.2 | - | $73.1 \pm 4.5$ | $81.4 \pm 2.4$ |
| medium-diverse | 53.7 | $81.1 \pm 3.1$ | $64.8 \pm 2.6$ | $79.3 \pm 2.5$ |
| large-play | 15.8 | - | $57.9 \pm 3.6$ | $69.1 \pm 2.3$ |
| large-diverse | 14.9 | $70.3 \pm 2.9$ | $43.7 \pm 1.3$ | $67.3 \pm 3.1$ |

FIG. 9

HIERARCHICAL PLANNING THROUGH GOAL-CONDITIONED OFFLINE REINFORCEMENT LEARNING

CROSS-REFERENCE TO RELATED APPLICATION

This application claims the benefit of U.S. Provisional Application No. 63/458,299, filed on Apr. 10, 2023. The entire disclosure of the above application is incorporated herein by reference.

TECHNICAL FIELD

The present disclosure relates to autonomous vehicle control, and, more specifically, to a system and method for training a system and operating a vehicle with a trained policy.

BACKGROUND

This section provides background information related to the present disclosure which is not necessarily prior art.

Reinforcement learning (RL) has been widely applied for a broad range of tasks in robotics. However, it remains challenging to solve those complex tasks with extended temporal duration with RL, especially for safety-critical applications, such as autonomous driving, where exploration can be risky and expensive. To avoid risky exploration, offline RL has drawn growing research attention for its ability to train RL policies from static offline datasets. Prior work has successfully deployed offline RL algorithms, but has not sufficiently investigated offline RL algorithms for temporally extended tasks.

SUMMARY

This section provides a general summary of the disclosure and is not a comprehensive disclosure of its full scope or all of its features.

The present disclosure is directed to a hierarchical planning framework for solving a Markov decision process through goal-conditioned offline reinforcement learning for safe-critical tasks with extended temporal duration, such as autonomous driving. The hierarchical planning framework comprises a low-level, goal-conditioned RL policy and a high-level goal planner. The low-level policy is trained via offline RL to deal with out-of-distribution goals by a perturbed goal sampling process. The high-level goal planner takes advantage of model-based methods by composing behavior and solves an optimization problem based on the low-level value function for long-term strategy.

In one aspect of the disclosure, a method of controlling a device includes training a low-level policy to form a trained low-level policy and a low-level value function to form a trained goal conditioned value function, wherein training is performed using a static data set using goal conditioned episodes, training a high-level goal planner having high level goals having high-level sub-goals corresponding to a plurality of future time steps using the low-level value function to maximize a cumulative reward over the sub-goals for the plurality of future time steps so that the sub-goals are reachable by the low-level policy, obtaining an observation of a device, and generating an executable action using the low-level policy and the high-level goal planner and operating the device with the executable action.

Other features of the disclosure include prior to training the low-level policy, forming goal-conditioned episodes from the static data set using hindsight experience replay, training the low-level policy using goal-conditioned episodes and out-of distribution goals by a perturbed goal sampling process, training the high-level goal planner using short Markov decision processes between sub-goals of consecutive sub-goals, the high-level goal planner being model-based comprising solving an optimization problem based on a low-level value function for a long-term strategy generating the executable action comprises generating the executable action based on maximizing the value function, training the high-level planner by selecting one of the plurality of sub-goals of a sequence of subgoals at a second time step subsequent to a first time step, training the high-level goal planner by generating the high-level sub-goals comprising reachable goals based on a reward, training the low-level policy comprises training the low-level policy and value function, the sub-goals corresponding to positions of an automotive vehicle and operating the device comprises controlling a steering wheel angle of a vehicle, an acceleration of the vehicle, or both.

In another aspect of the disclosure, a system comprising a computer-readable medium storing computer-executable instructions that, when executed by a processor, is configured train a low-level policy to form a trained low-level policy and a low-level value function to form a trained goal conditioned value function, wherein training is performed using a static data set using goal conditioned episodes, said low level function comprising a reinforcement learning policy, train a high-level goal planner having high level goals having high-level sub-goals corresponding to a plurality of future time steps using the low-level value function to maximize a cumulative reward over the sub-goals for the plurality of future time steps so that the sub-goals are reachable by the low-level policy, obtain an observation of a device, generate an executable action using the low-level policy and the high-level goal planner and operate the device with the executable action.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a block diagrammatic view of an autonomous vehicle having the control system of the present disclosure.

FIG. 4 is an algorithm for training of the hierarchical goal conditioned offline reinforcement learning policy process.

FIG. 5 is a hierarchical goal conditioned planner process.

FIG. 7 is a table with various process versions using medium and expert quality data.

FIG. 8 is a table for performance of the system and meth with a whole town map.

FIG. 9 is a table for normalized scores for robot in antmaze environments.

Corresponding reference numerals indicate corresponding parts throughout the several views of the drawings.

DETAILED DESCRIPTION

Figure 2:
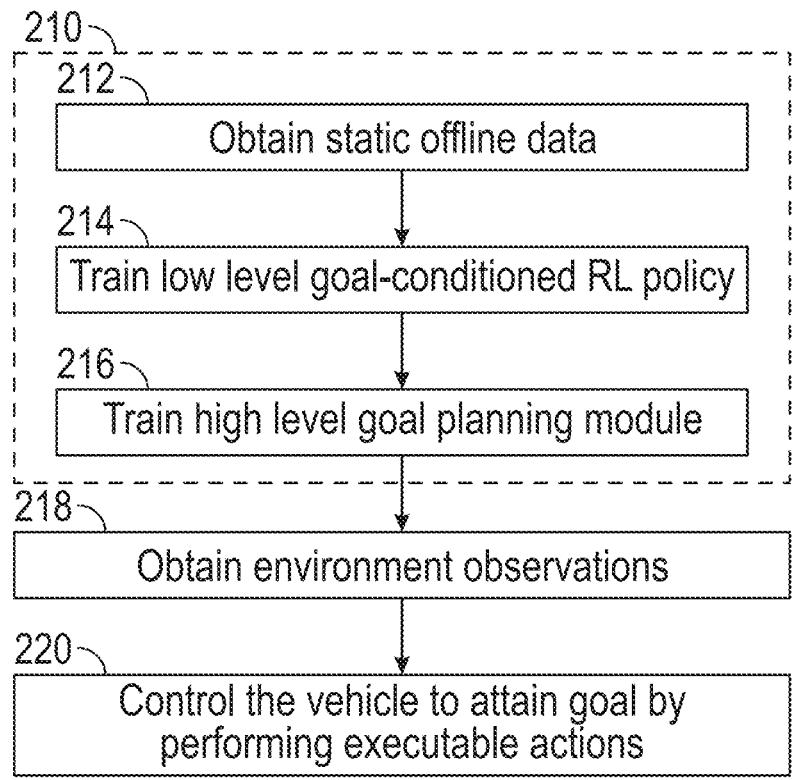
FIG. 2 is a flowchart of a method for operating the control system.

Example embodiments will now be described more fully with reference to the accompanying drawings.

Figure 1:
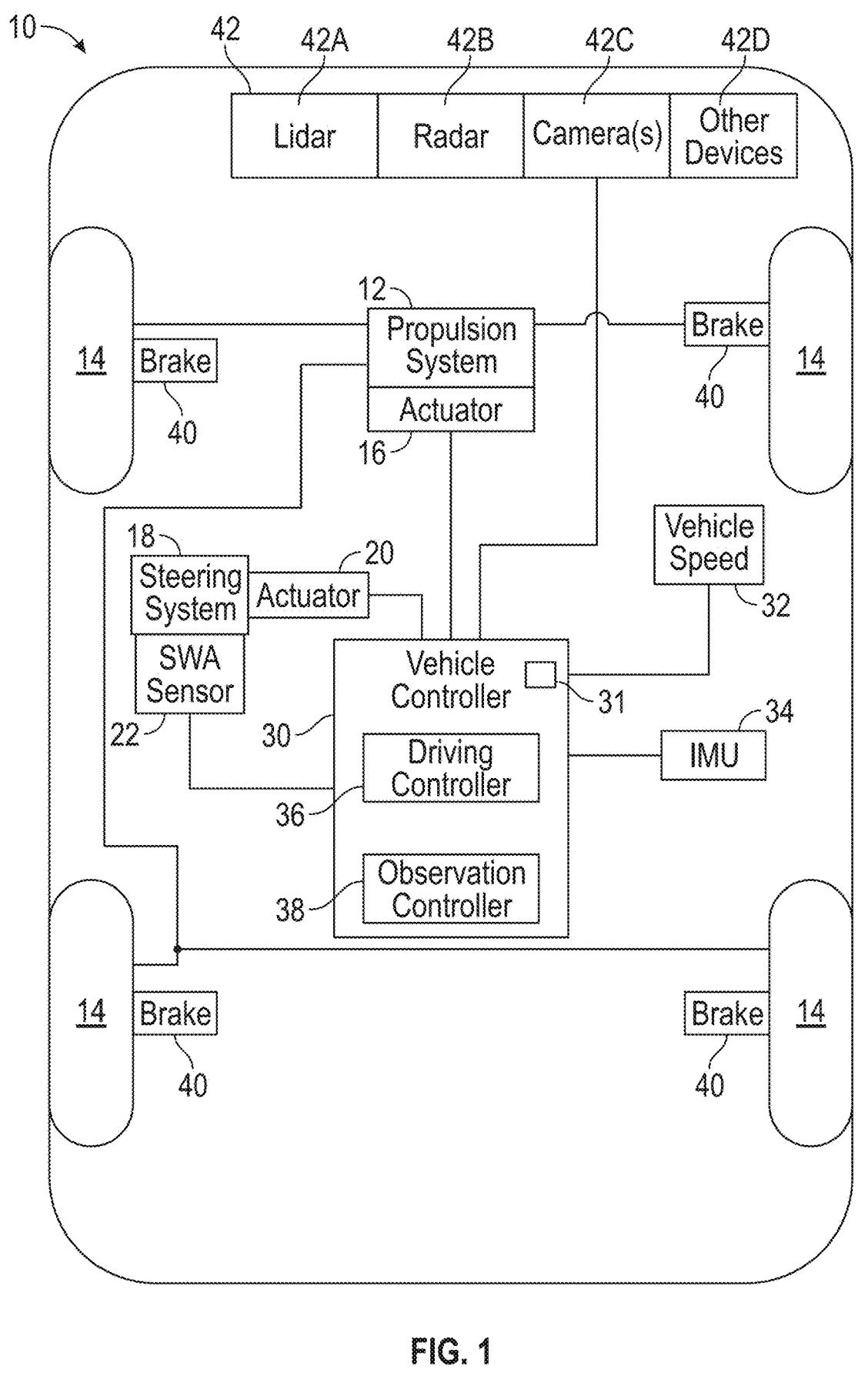

Referring now to FIG. 1, a vehicle 10, such as an autonomous automotive vehicle, is illustrated having various components. Although a passenger vehicle is illustrated, the present teachings apply to other types of vehicles including trucks, sport utility vehicles, recreational vehicles, marine vessels, aircraft, trains and the like. The teachings of the present disclosure also may be applied beyond the automotive field including the field of robotics.

The vehicle 10 has a propulsion system 12 that is used to provide power to the wheels 14 of the vehicle 10. The propulsion system 12 is illustrated simply but may represent various types of propulsion systems including internal combustion, hydrogen and electric vehicles. Depending on the type of system, different ways for coupling to the wheels 14 may be provided. Further, the propulsion system 12 is illustrated coupled to each of the wheels 14. However, less than all of the wheels 14 may be propelled by a propulsion system 12. The propulsion system 12 includes an actuator 16, such as a throttle, which receives an input to control the propulsion system 12.

A steering system 18 is used to steer the wheels 14 such as the front wheels, rear wheels or both. The steering system 18 includes an actuator 20, such as an electric motor, for positioning the steered wheels 14 in a desired direction. A steering wheel angle sensor 22 generates a steering angle signal that corresponds to the angle of the steered wheel.

A vehicle controller 30 that is microprocessor-based with a computer readable storage medium 31 such as a memory therein is set forth. The vehicle controller 30 may be one or a plurality of microprocessors used to perform various functions from the computer readable storage medium 31. Details of the vehicle controller 30 are described below. In this example, the vehicle controller 30 is in communication with the steering system 18 through the actuator 20 and receives feedback from the steering system 18 from the steering wheel angle sensor 22. The vehicle controller 30 is also in communication with the propulsion system 12 and the actuator 16.

The vehicle controller 30 also receives signals from other components such as a vehicle speed sensor 32. The vehicle speed sensor 32 generates a vehicle speed signal that corresponds to the speed of the vehicle 10. The vehicle speed sensor 32 may be a combination or sensors located at each wheel to provide the vehicle speed at each wheel which, in turn, are used to calculate the overall vehicle speed.

An inertial measurement unit (IMU) 34 is used to generate inertial signals corresponding to the yaw, pitch and roll axes and the moments therearound. The accelerations in each of the X, Y, and Z directions are generated by the IMU 34. Of course, individual sensors not in an IMU 34 may be used. In particular acceleration sensors on the X and Y direction may be used to provide feedback to a driving controller 36 of the vehicle controller 30 so that a desired vehicle may be obtained during each segment or sub-goal.

The driving controller 36 that is used to autonomously or semi-autonomously drive the vehicle 10 based upon the various input sensors and the teachings set forth herein. The driving controller 36 may be used to control the actuator 20 of the steering system 18 and the propulsion system 12 through executable actions to provide a particular steering wheel angle and acceleration and/or velocity and based upon the various sensed conditions to attain the desired trajectory, goal or sub-goal. The sensed conditions may be used to form an observation in an observation controller 38 located within the vehicle controller 30. The observation controller 30, as will be described and illustrated below, provides observations that are used to determine the type of control for the vehicle.

Other vehicle systems include a brake system that has brakes 40 located at each of the wheels 14. The brake system 40 may include friction brakes, brake by wire and regenerative braking systems when used in electric vehicles. Negative acceleration can be obtained by applying one or more of the braking systems. Applying the brakes may therefore be an executable action.

Image sensors 42 may also be used in the vehicle 10 to form observations used to generate the goals such as the desired steering wheel angle, acceleration and velocity. The image sensors 42 include, but are not limited to, lidar 42A, radar 42B, a camera 42C and other devices 42D. The sensors 42A-42D are illustrated singularly. However, the sensors 42A-42D may be provided in various numbers of each directed in various directions so that a complete 360° view around the vehicle is obtained. The sensors 42A-42D are used by the observation controller 38 to generate the observation or location of the vehicle 10 relative to its surroundings. The driving controller 36 controls the trajectory of the vehicle 10 based upon the various sensors which form observations. Examples of observations are provided below.

Referring now to FIG. 2, a high-level method for operating the vehicle is set forth. In general, the driving controller 36 is trained in step 210. The training is set forth in greater detail below. In general, the training has multiple sub-steps that correspond to future time steps. In step 212, static offline data is obtained as the training input. In step 214, a low-level goal conditioned reinforcement learning policy is trained using the static off-line data. To save time during processing, only one low level policy is determined from the static offline data. The static offline data is used to train high-level goal planning module. In particular, a low-level trained goal conditioned value function is obtained during training. The high-level goal planning module is trained using the low-level value function obtained in step 216.

After training, the environment observations are generated in step 218. The environment observations, in this example, are observation images which are two dimensional images placing the vehicle 10 on the road. Based on the environmental conditions and the trained policy and high-level goal planning, vehicle is controlled to obtain a goal by performing executable actions. The executable actions may include controlling various vehicle systems including the steering wheel angle of the vehicle, the acceleration of the vehicle and the velocity of the vehicle. The velocity and acceleration of the vehicle may be changed by operating the propulsion system 12 and operating the brake system 40. The steering wheel angle may be controlled by controlling the actuator 20. Feedback from the vehicle speed sensor 32 and the inertial measurement unit 34 may also be used for feedback.

Figures 3A, 3B:
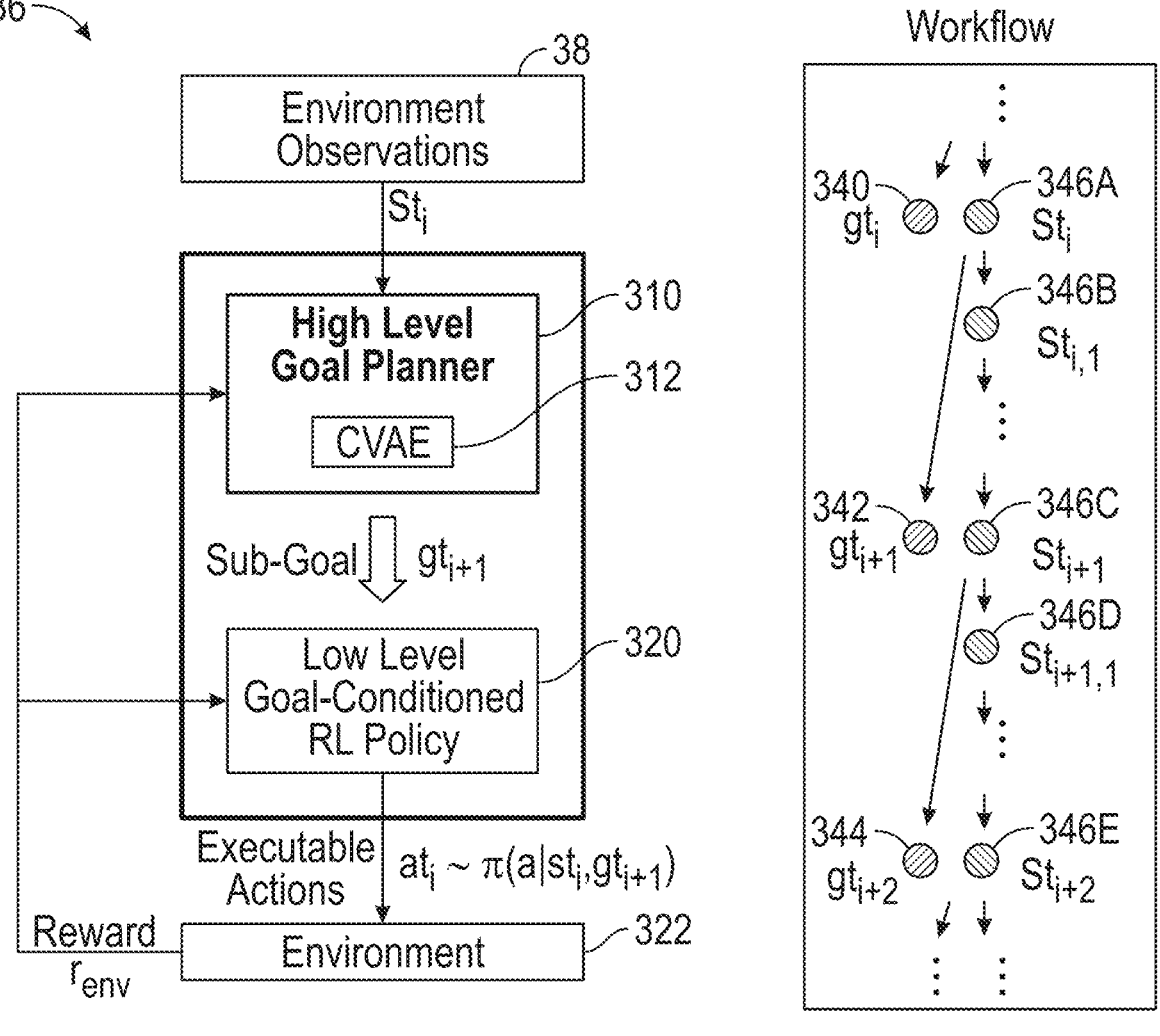
FIG. 3A is a block diagrammatic hierarchical goal-conditioned offline reinforcement learning framework in accordance with the present disclosure.
FIG. 3B illustrates a workflow of the hierarchical goal-conditioned offline reinforcement learning framework in accordance with the present disclosure.

Referring now to FIG. 3A, the hierarchical goal-condition system is provided. In this example, environment observations are provided to the driving controller 36. The driving controller 36 has a high-level goal planner 310 that has high level goas and uses sub-goals as a look ahead feature. A trained low-level goal condition reinforcement learning policy 320 together with the high-level goal planning generates executable actions such as the steering wheel angle and the acceleration of the vehicle that provided to change the vehicle relative to the environment 322. During training a reward function is fed back to the high-level goal planner 310 and the low-level goal-condition reinforcement learning policy 320 as described in greater detail below.

Referring now also to FIG. 3B is a representation of the workflow for the system. The workflow shows the sub-goals 340 with the letter g. Three sub-goals 340, 342 and 344 are illustrated. With each of the sub-goals, the low-level goal-conditioned reinforcement learning policy determines states 346A-346E.

As noted above, the present disclosure is directed to a hierarchical planning framework for solving a Markov decision process (MDP) through goal-conditioned offline reinforcement learning for safe-critical tasks with extended temporal duration, such as autonomous driving. The hierarchical planning framework comprises a low-level, goal-conditioned reinforcement learning (RL) policy and the high-level goal planner 310. The low-level policy 320 is trained via offline RL to deal with out-of-distribution goals by a perturbed goal sampling process. The high-level goal planner takes advantage of model-based methods by composing behavior and solves an optimization problem based on the low-level value function for long-term strategy. The present disclosure addresses these issues in the context of autonomous driving, which is considered an important step for pushing forward the applications of RL in autonomous vehicles, as well as other safety-critical intelligent agents. The low-level policy is trained to form a trained low-level policy and a low-level value function to form a trained goal conditioned value function. The training is performed using a static data set using goal conditioned episodes.

More specifically to deal with extended temporal duration, a hierarchical framework is adopted, with a low-level policy 320 controlling the planner or driving controller 36 to accomplish short-term tasks, while receiving supervision from the high-level module goal planner 310 about long-term strategy. The high-level module 310 may either be a model-free RL policy or a planning module. The driving controller 36 in particular combines the low-level goal-conditioned RL policy 320 and the high-level planner 310 to leverage model-based planning methods to guide a goal-reaching policy with a sequence of sub-goals. This configuration can take advantage of model-based approaches to handle long-horizon tasks by composing behaviors and is particularly suitable for an offline setting as only learning a short-horizon goal-reaching policy from offline dataset is required, which is easier and more data-efficient than directly learning an end-to-end policy solving the entire task.

A hierarchical planning framework through goal-conditioned offline reinforcement learning is set forth in greater detail below. To train the goal-conditioned policy, the present disclosure utilizes Hindsight Experience Replay (HER) to synthesize goal-conditioned episodes from static data or datasets. The goal condition episodes are used to train the low-level policy 320 with model-free offline RL algorithms. One known issue with offline RL is distributional shift. Prior systems/methods have addressed the problem of out-of-distribution (OOD) states and actions. The present disclosure also addresses OOD goals. The systems and methods of present disclosure, for example, generate noisy unreachable goals by a perturbed goal sampling process. By incorporating the noisy goals into the training process, the systems and methods of the present disclosure inform the high-level planner to avoid OOD goals during online execution.

The high-level sub-goal planner plans over intermediate sub-goals based on a goal-conditioned value function of a low-level policy. Prior systems and methods have used a framework developed for a finite-horizon goal-conditioned Markov decision process (MDP) with an objective of reaching a target goal point. In contrast, the present disclosure generalizes and utilizes arbitrary MDPs because multiple criteria, besides reachability, must be considered for applications such as autonomous driving. In some prior systems, a variational autoencoder (VAE) is adopted to model high-dimensional image observation space so that the planner can optimize over the sub-goals within a meaningful image space. However, the sub-goals at different timesteps are modeled independently, which induces too much noise into the optimization procedure. The systems and methods of the present disclosure, on the other hand, use a conditional Variational Auto-Encoder 312 (CVAE) instead so that the sub-goal sequences can be sequentially reconstructed for evaluation, which results in more accurate sub-goal candidates and better planning performance. Training the high-level goal planner having high level goals having high-level sub-goals corresponding to a plurality of future time steps is performed using the low-level value function to maximize a cumulative reward over the sub-goals for the plurality of future time steps so that the sub-goals are reachable by the low-level policy.

The systems and methods of the present disclosure evaluate a proposed framework for planning in driving scenarios using, for example, the CARLA simulator, which is an open-source simulator for autonomous driving research. Experimental results show that framework of the present disclosure is superior to prior systems and methods that utilize a policy trained by regular offline reinforcement learning methods without any hierarchical design. The trained value function can quantify the quality of different goal candidates in the high-level goal planner. Also, the framework of the present disclosure can be generalized to complex driving scenes with lower collision rates than baselines.

Step 216 is explained in further detail. While a low-level policy only requires a single sub-goal from a high-level planner, in the systems and methods of the present disclosure, the driving controller 36 or planner can optimize over multiple sub-goals into the future horizon to ensure an optimal long-term strategy, which is critical for solving temporally extended tasks. This can be formulated as a constrained optimization problem of maximizing the cumulative reward over sub-goals for multiple future steps with a constraint to force the sub-goals to be reachable by the low-level policy. The solution is a sequence of H sub-goals for H future high-level time steps, but only the first one can be selected for execution in practice while a new one is solved for at the next time step.

Formally, the constrained optimization problem is formulated as follows:

$$\max_{g} V_{env}^{\pi}(s_{t_0}, t_0) + \sum_{i=1}^{H} V_{env}^{\pi}(g_{t_i}, t_i) \tag{1}$$

$$\text{s.t. } V_{TDM}^{\pi}(s_{t_0}, g_{t_1}, t_0) + \sum_{i=1}^{H} V_{TDM}^{\pi}(g_{t_i}, g_{t_{i+1}}, t_i) \geq 0,$$

where $$g = \left[g_{t_1}^{T} \cdots , g_{t_H}^{T}\right]^{T}$$

is the sub-goal sequence of interest, $s_{t_0}$ is the initial state, and $$V_{env}^{\pi}(s_{t_i}, t_i) = \mathbb{E}\left[\sum_{j=1}^{N} r_{env}(s_{t_{i,j}}, a_{t_{i,j-1}}) \,\middle|\, \pi\right]$$

$$V_{TDM}^{\pi}(s_{t_i}, g_{t_{i+1}}, t_i) = \mathbb{E}\left[\sum_{j=1}^{N} r_{TDM}(s_{t_{i,j}}, g_{t_{i+1}}, t_{i,j}) \,\middle|\, \pi\right]$$

where $r_{env}$ is the reward function defined in the original MDP environment, and $r_{TDM}$ is the auxiliary goal-conditioned reward function. Further, $r_{TDM}$ to is defined through a temporal difference model (TDM) that is often adopted in prior goal-conditioned policy learning works.

The TDM reward function is often in the form:

$$r_{TDM}(s_r, g_t, \tau) = -\delta(\tau = t)d(s_\tau, g_t),$$

where $\delta(\cdot)$ is the indicator function, and d is a distance function specified in tasks. By forcing the expected cumulative reward $r_{TDM}$ to be non-negative, the resulting g is guaranteed to be reachable.

The optimal solution of equation (1) can be obtained by solving the following max-min optimization problem, where the objective is the Lagrangian function of equation (1):

$$\max_{g} \min_{\beta \geq 0} V^{\pi}(s_{t_0}, g_{t_1}, t_0) + \sum_{i-1}^{H} V^{\pi}(g_{t_i}, g_{t_{i+1}}, t_i) \tag{2}$$

$$\text{where } V^{\pi}(s_{t_i}, g_{t_i} t_i) = \tag{3}$$

$$V_{env}^{\pi}\left(V^{\pi}(s_{t_i}, t_i) + \beta V_{TDM}^{\pi}(s_{t_i}, g_{t_{i+1}}, t_i)\right) = \mathbb{E}\left[\sum_{j=1}^{N} r_{env} + \beta r_{TDM} \,\middle|\, \pi\right]$$

The augmented value function $V^{\pi}$ is essentially the value function of the low-level policy $\pi$ regarding an augmented reward function $r_g$, which is the weighted sum of the original environmental reward and the auxiliary TDM reward:

$$r_g(s_\tau, a_\tau, g_t, \tau) = r_{env}(s_\tau a_\tau) + \beta r_{TDM}(s_\tau g_\tau, \tau).$$

It is now practical to solve the optimization problem which encourages the solution to be a reachable goal state in the state space. The present disclosure focuses on tasks with high-dimensional images as observations. The present disclosure follows the convention of using a cross-entropy method as the optimizer. To this end, the systems and methods of the present disclosure sample meaningful images as valid goal states from the state space $\mathcal{S}$.. Generally, the systems and methods of the present disclosure do not have an explicit high-dimensional bound between meaningful images and invalid white noise, but it is possible to find a method that implicitly encourages valid samples. One method is modeling the goal distribution with a generative model such as VAE. In particular, the systems and methods of the present disclosure adopt the conditional variational auto-encoder (CVAE) 312.

The CVAE 312 models the transition from one goal to the next in the dataset and consists of an inference mapping, i.e., an encoder $E_\mu(z|g_{t_i}, g_{t_{i+1}})$, and a generative mapping, i.e., a decoder $D_\nu(g|g_{t_{i+1}}|g_{t_i}, z)$.

The inference network maps a present goal state $g_{t_i} \in \mathcal{S}$. to a latent state $Z \in \mathcal{Z}$ condition on its next goal $g_{t_{i+1}}$, where $\mathcal{Z}$ is the latent space.

The generative mapping, which conditions on the original input $g_{t_i}$, maps the latent state $z \in \mathcal{Z}$ to the next goal $g_{t_{i+1}}$. The latent space $\mathcal{Z}$ is often low-dimensional, and the latent state z follows a specified prior distribution p(z). By decoding goal states from latent variables sampled from the prior p(z), the systems and methods of the present disclosure essentially sample goal states from a distribution approximating the goal distribution in the dataset. Consequently, the sampled images are more likely to be meaningful and correspond to in-distribution goal states. More importantly, different from the VAE used in prior systems, conditioning on the present state image reduces unnecessary variance. The sampled goals are those that are more likely given the current state. It improves the sampling efficiency and leads to better optimization performance of the cross-entropy method.

The objective function can then be optimized over the latent representation of the goal images, where $g_{t_{i+1}} = D_\nu(g_{t_i}, z_{t_{i+1}})$ is the reconstructed goal from sampled latent state $z_{t_{i+1}}$ conditioned on the previous goal $g_{t_i}$.

An additional regularization term $-\lambda \log p(z)$ is added to penalize the z with low prior probability, where $\lambda$ is a trade-off factor between the measure of optimality and the out-of-distribution penalty.

The operation of the low-level goal conditioned reinforcement learning policy 320 and step 214 is set forth.

After the high-level sub-goal planner 310, the systems and methods of the present disclosure continue to develop the low-level policy and aim to combine goal-conditioned training techniques with offline reinforcement learning to train the low-level policy from the static dataset. In particular, the systems and methods of the present disclosure need to train not only the policy $\pi$, but also the value function $V^{\pi}$.

The pre-collected datasets to train the goal-conditioned policies only include state and action transition pairs and corresponding rewards.

There are no goals defined in training datasets originally, so the systems and methods of the present disclosure must create a goal for each sampled state-action pair during training.

The trajectories are valid ones to reach any state within themselves, which makes it reasonable to use any state within each trajectory as its goal.

Therefore, following the hindsight experience replay, using a sampled pair $$\left( s_{t_{i,j}}^k, a_{t_{i,j}}^k, s_{t_{i,j+1}}^k, r_{env,t_{i,j}}^k \right)$$

from the k-th trajectory in the training dataset, the present disclosure relabels the goal as $$g_{t_{i+1}}^k = s_\tau^k \text{ where } s_\tau^k$$

is a random future state within the whole. The new reward is relabeled as:

$$r_{g,t_{i,j}}^k \leftarrow r_{env,t_{i,j}}^k + \beta r_{TDM,t_{i,j}}^k .$$

The IDM reward is computed regarding the labeled goal $$g_{t_{i+1}}^k .$$

The new pair $$\left( s_{t_{i,j}}^k, a_{t_{i,j}}^k, s_{t_{i,j+1}}^k, g_{t_{i+1}}^k, r_{g,t_{i,j}}^k \right)$$

is used as the training data to update the goal-conditioned value function and policy.

Many prior systems and methods of offline RL have dealt with known distributional shift problems. Under the goal-conditioned setting, the systems and methods of the present disclosure need to additionally handle OOD goals, which is similar to the problem of OOD states. However, when dealing with OOD states, existing systems/methods require a dynamic model to estimate state uncertainty, which is difficult to learn in high-dimensional observation space. Alternatively, the present disclosure provides new systems and methods to solve the distributional shift problem caused by OOD goals.

Concretely, the systems and methods of the present disclosure perturb the goal in the sampled data point by noise with a probability η, and then the reward $$r_{g,t_{i,j}}^k$$

is relabeled as the new noisy data point. In this way, the systems and methods of the present disclosure penalize the value at OOD goals, because a η-portion of the goals in the sampled data batch become noisy and were never achieved in the dataset. Thus, the corresponding TDM rewards will always be negative. Hence, the high-level goal planner using the same value function will be encouraged to avoid those low value areas at OOD goals, which will implicitly affect the low-level policy during test time.

The systems and methods of the present disclosure integrate the high-level goal planner and the low-level goal-conditioned policy to form a practical implementation, which is referred to as a Hierarchical Goal-Conditioned offline reinforcement learning (HiGoC) framework to be used in autonomous driving decisions.

Given a static offline dataset containing K expert trajectories:

$$\mathcal{D} = \left\{ \left\{ \left( s_{t_{i,j}}^k, a_{t_{i,j}}^k, s_{t_{i,j+1}}^k, r_{env,t_{i,j}}^k \right) \right\} i, j, k = 1, \ldots, K \right\}$$

the training procedure is shown in Algorithm 1, illustrated in FIG. 4. For example, the CVAE 312 is first trained to model the observation distribution in the dataset. Then, the low-level goal-conditioned policy and the corresponding value function is trained through Conservative Q-Learning (CQL), which is customized for the goal-conditioned settings. In the test phase, the systems and methods of the present disclosure query the hierarchical planner to control the driving controller 36. A hierarchical goal-conditioned (high-level) planner is shown as Algorithm 2, illustrated in FIG. 5.

Using the CARLA Simulator, the present disclosure was evaluated for autonomous driving. In particular, various driving tasks in a virtual urban town where the reward is given by the simulator evaluating the safety and efficiency of driving was performed. Low-level There are 30 obstacle vehicles in total running in the whole map, so that a realistic environment with intense interactions with surrounding vehicles is simulated. In experiments, an evaluation in a local map containing a roundabout in the virtual town is performed. Afterwards, the experiment is extended to the whole town to evaluate the ability of the present disclosure in building reliable policies in more general and realistic scenes. In experiments, static pre-collected training datasets were used to train the planner. To collect training data, an expert is trained using soft actor-critic (SAC) method with the default reward function in each environment. The expert is then executed in the corresponding environment to record trajectories. After the collection of training datasets, the present system, HiGoC, is trained in an offline setting. During the test time, the vehicle controller 26 or agent with the trained policies in a simulator. During the driving process the value function trained in the low-level policy and used by the high-level goal planning is maximized to obtain the executable actions to obtain the desired steering wheel angle and acceleration.

Datasets with different levels of quality, namely "medium" and "expert" datasets may be composed. "Medium" datasets are collected by first training the expert using SAC, early stopping the training, and recording the trajectories with the half-trained expert in the environment. "Expert" datasets are collected with fully trained experts.

Antmaze in D4R may be used to evaluate the present method for robot navigation tasks from offline RL benchmarks, which are the Antmaze tasks in the D4RL dataset. The dataset mainly consists of trajectories collected with undirected navigation of the simulated ant robot.

The agent has to learn from the dataset to solve specific point-to-point navigation tasks. The task can be categorized into three difficulty levels: simple (i.e., umaze), medium, and difficult (i.e., large).

When comparing the present disclosure, HiGoC, with two baselines: a) CQL, which is one of the state-of-the-art offline RL algorithms for end-to-end policy training. IRIS, which is also a hierarchical framework learned from offline dataset, with a high-level offline RL goal planner and a low-level imitation learning policy. For the antmaze experiments, another approach for comparison, OPAL, which is another hierarchical framework with a high-level strategy planner and a low-level primitive controller. Different settings of the present disclosure, HiGoC were used. A different look-ahead horizon H was used are the data compared. A longer horizon enables the planner to better optimize long-term behavior. Meanwhile, errors of the value function and the CVAE model accumulate along the planning horizon. These two factors may trade off and affect the overall performance. The notation "H-step" is used to distinguish planners with different H. For instance, "2-step" refers to a planner with H=2.

Different goal-sampling period N may be used. The goal-sampling period determines the episode length of the low-level goal-reaching MDP. As a result, it affects the accuracy of the learned value function. Variants with different sampling period may be specified as "HiGoC-N$\Delta$t". For instance, "HiGoC-0.4 s" refers to a variant with N=4 since the sampling time of the simulator is 0.1 s.

Variant without goal perturbation may be considered. In this variant, one without goal sampling perturbations during training, denoted by "HiGoC-no noise". It has a goal-sampling time of 0.4 s. By comparing it with the variant "HiGoC-0.4 s," the proposed method can effectively mitigate the issue of OOD goals and lead to better performance.

The main evaluation metric is the normalized score (NS) [1]. The normalized score is defined as:

$$NS = 100 * \frac{\text{score} - \text{random score}}{\text{expert score} - \text{random score}}.$$

The score of each variant is the cumulative reward during test time after the whole training process finishes, namely, after 500 K gradient steps in CARLA and 1 M in antmaze. For the complex whole-own driving task, the collision rate was reported to give the audience a straightforward impression on the driving skill of the trained agents. 100 episodes were rolled out, and compute the ratio of trajectories containing collisions.

The results of a comprehensive study on the small local map, comparing all the different settings are summarized in the table set forth in FIG. 7.

Figure 6:
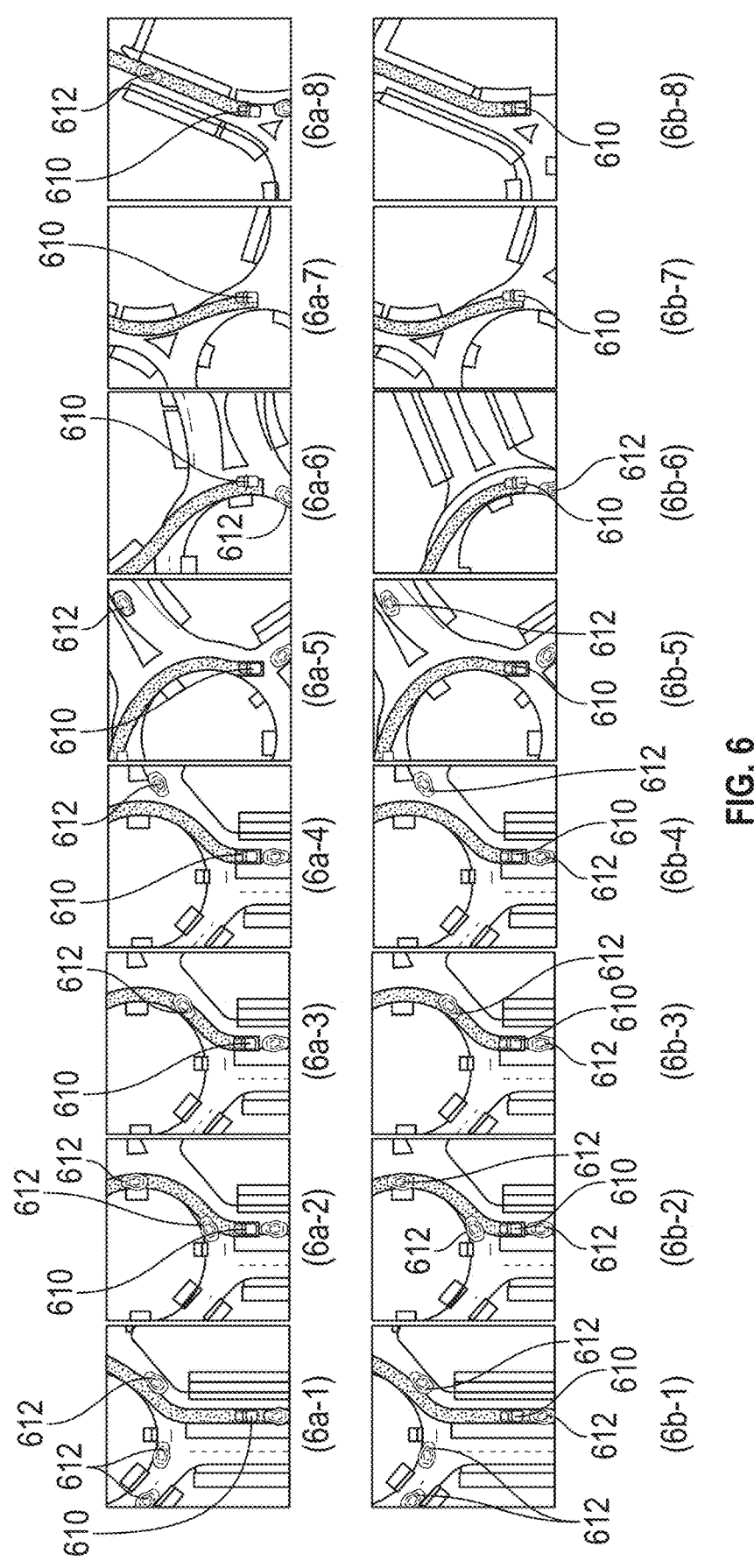
FIG. 6 illustrates a visualization of a trajectory in a local map of a roundabout in accordance with the present disclosure.

HiGoC with the end-to-end policy baseline is used to evaluate the benefit of the hierarchical structure. From FIG. 7, the performance of CQL is lower than all the other HiGoC variants (above 90.0). It is because the hierarchical planner is less greedy than the end-to-end policy. In FIG. 6, sampled trajectories of the trained driving controller 36 passing through a roundabout in the local map with the variant "7-step HiGoC-0.4 s" were used. When the ego car 610 is entering the roundabout, it first yields to the two obstacle vehicles 612. Afterwards, it enters the roundabout and navigates through it successfully. When the ego vehicle 610 is equipped with a non-hierarchical offline RL policy as shown in observations (a-1) through (a-8), it is very difficult for the ego car to slow down and yield to obstacles at the entrance of the roundabout. In contrast, even though the goals sampled by the CVAE 312 are vague and twisted, they are informative enough to guide the planner to be less aggressive and greedy as illustrated by the observations (b-1) through (b-8).

The performance of HiGoC when trained on datasets with different levels of quality is compared. When trained on the "medium" dataset, HiGoC tends to achieve score that is closer to the corresponding expert. Since the data-collecting agent for the "Medium" dataset is controlled by an early-stopped policy, its policy is suboptimal with larger variance. Hence, the "Medium" dataset tends to cover larger state and action space. In contrast, the state and action distribution in the "Expert" dataset is much more concentrated. The offline reinforcement learning (RL) agent is more suited in the settings where larger data coverage is provided. Therefore, it is reasonable that the agent is able to reach closer performance to the "Medium" level demonstration than the "Expert" level one.

The robust to distributional shift is shown in In FIG. 7, the normalized scores of "HiGoC-no noise" are consistently lower than "HiGoC-0.4 s" in almost all the settings. It indicates that the method to increase the robustness against distributional shift is effective. It is worth noting that "HiGoC-no noise" still outperforms CQL on both datasets, demonstrating that the hierarchical structure is beneficial to solve the overall task.

The overall planner is essentially a receding horizon controller, i.e., model predictive control (MPC). The optimization in Eqn. 4 is solved by CEM online during the test time, and the computing time is within 100 ms which is sufficient for the framework to plan at a frequency of 10 Hz. From control theory, if a precise dynamic model that can perfectly predict the behavior of the environment, the performance of the controller improves as the look-ahead horizon H increases. In the high-level goal planner 310, the value function is equivalent to a prediction function estimating future cumulative rewards from the present state. Ideally, the trained agent should have better performance with longer H. However, the normalized score peaks at 7-step look-ahead with 0.4 s goal-sampling period. The normalized score began to drop when further increasing H. If a goal-sampling period of 2.0 s is selected, the highest normalized score is achieved with H=1. It is because the learned value function becomes less accurate when predicting the far-away future. There is a trade-off between prediction accuracy and long-term planning capability.

IRIS was also used in a comparison. The present disclosure process, HiGoC was compared against IRIS with different look-ahead horizons. Similar to ours, their high-level planner also selects a reference goal for the low-level goal-conditioned policy. The main difference is that IRIS chooses the optimal goal as the one with the highest expected future return in the original task MDP. In contrast, HiGoC chooses the sub-goal by finding the optimal sub-goal sequence over the look-ahead horizon, where the objective function is defined based on the value functions of the short-term goal-reaching MDPs between consecutive look-ahead time steps. Also, the low-level goal reaching policy of IRIS is learned with imitation learning, whereas ours is trained with offline RL. IRIS with different look-ahead horizons, i.e., the number of timesteps between the current state and the goal point was used. As shown in FIG. 1, HiGoC consistently outperforms IRIS under different look-ahead horizons. Two factors contribute to this performance gain. Firstly, IRIS requires accurate estimation of the value function for the original taskMDP, which is difficult for temporally extended tasks, especially under the offline setting.

In contrast, HiGoC composes long-term behavior online based on the value functions of the short-term goal-reaching MDPs, which are easier to estimate via offline learning. That is better results are achieved when the high-level goal planner uses the value function determined in the low-level policy 320. Secondly, the low-level goal-reaching policy of IRIS is trained by imitation learning instead of offline RL. The offline RL agent is able to compose behavior that is better than the demonstration from the offline dataset.

To further evaluate the ability of the present procedure, HiGoC, in learning driving policies for more general and realistic scenes, the present disclosure was used with a much larger driving scene in the CARLA simulator, the whole "Town03" map. Two settings with different look-ahead horizons, i.e., "7-step HiGoC-0.4 s" and "1 step HiGoC-0.4 s". As shown in FIG. 8, both variants of HiGoC outperform the baseline CQL, indicating the benefit of hierarchical structure in long-horizon tasks. In particular, HiGoC 7 step has better performance. It further confirms that longer look-ahead steps can benefit the high-level strategy reasoning even in these complex tasks. Also, the performance of HiGoC is better than IRIS. It further confirms the advantage of HiGoC over IRIS in composing optimal long-term behavior. It was noticed that the agent reaches performance closer to the "Expert" than the "Medium" level demonstration in this complex scenario. One possible reason is that the same size of training dataset as the one in the local map was used, which is relatively small in this much larger scene. Although the "Medium" level dataset consists of more diverse samples, it does not have sufficient samples to cover high-reward state-action pairs in the whole town. Thus, it limits the training quality.

Most of the collisions are caused by the ego vehicle bumping into the rear-end of the preceding vehicle. It is because the current representation of observations only involves implicit velocity information (the historical positions of vehicles), and the lack of velocity information is also magnified by the encoding process of the CVAE 312. Nevertheless, the collision rate with the hierarchical architecture is reduced. It indicates that the hierarchy can prevent the agent from being too greedy. Therefore, including velocity in the analysis would improve the results.

Apart from the velocity information, it is also possible to further improve the performance from other aspects of representation. The current observation representation makes it necessary for the high-level planner to reason about the future road map in addition to the surrounding vehicles. In practice, it is a common practice for autonomous vehicles to have access to the map of the whole town in advance. If a representation with richer map information is leveraged, it will no longer be necessary for the high-level planner to forecast map change. Plus, a better representation will also enhance the capacity of the CVAE model. With a more accurate CVAE model, the sampled goal sequences are more likely to be realizable and optimal.

The experimental results in the antmaze robotic environment are described. In FIG. 9, the present method, HiGoC, has better performance than CQL and IRIS, especially in those challenging environments (i.e., medium and large). It is because the episode length increases with the size of the maze, which makes it more critical to compose long-term optimal behavior in order to succeed in these environments. The results further verifies the advantage of HiGoC over CQL and IRIS in temporally extended tasks. In FIG. 9, we also report the scores of OPAL collected from their paper. Since OPAL is deliberately designed to learn from offline data consisting of varied and undirected multi-task behavior, they only evaluated their methods on the medium/large-diverse antmaze environments. While HiGoC is not specially designed for diverse offline data, it still achieves performance close to OPAL in those environments.

Figure 10:
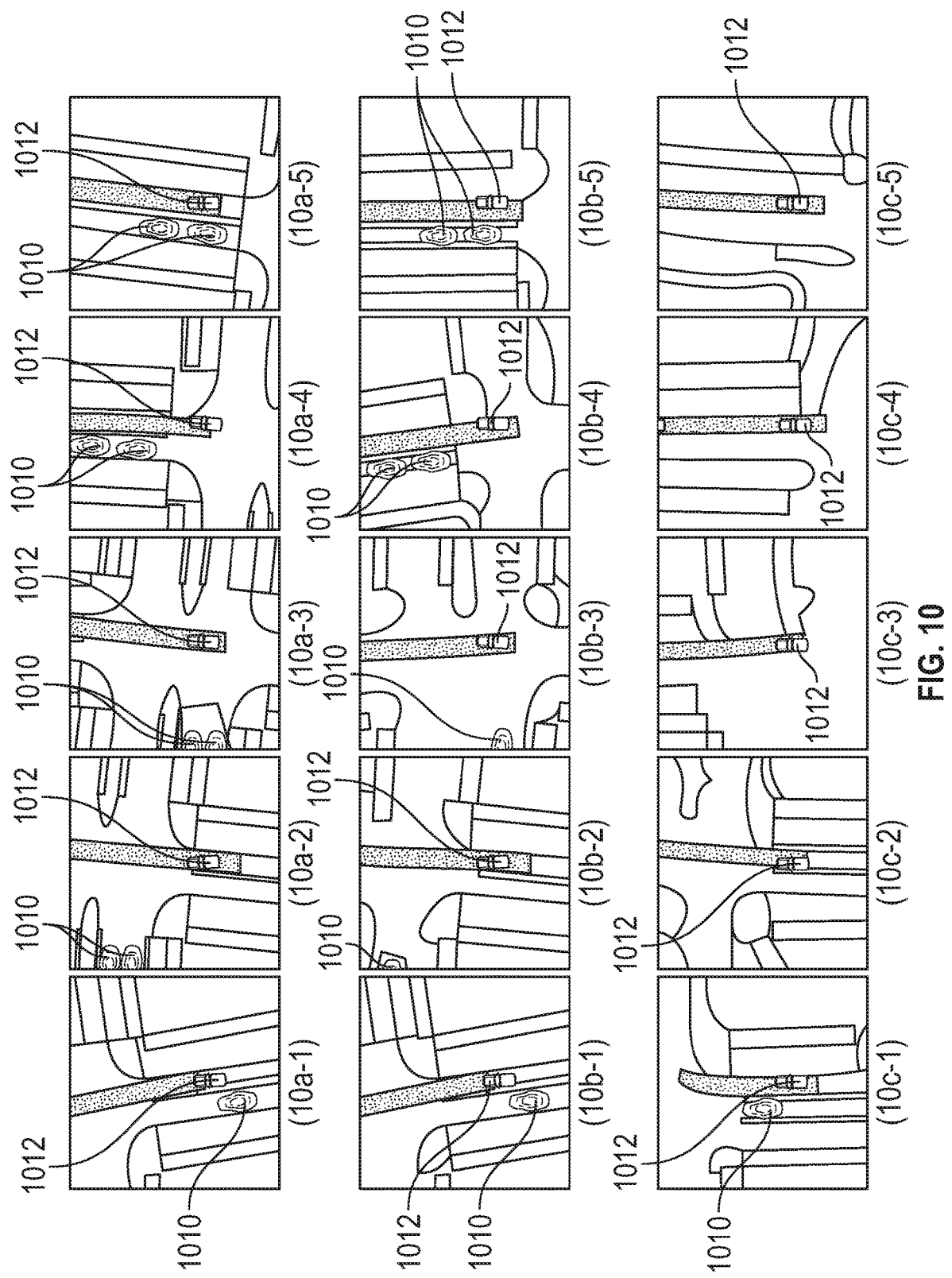
FIG. 10 illustrates a visualization of a sampled trajectory, including actual observation images, corresponding goals selected by a goal planner with a Conditional Variational Autoencoder (CVAE), and corresponding goals selected by a goal planner with a variational autoencoder (VAE), in accordance with the present disclosure.

Referring now to FIG. 10, the goal sequences sampled from the CVAE and VAE in the same scenario are set for in 10*a*-1 through 10*a*-5 relative to an object car 1012. From FIGS. 10*c*-1 to 10C-5, the goals sampled from the VAE are vaguer than those sampled from CVAE in FIGS. 10*b*-1 to 10*b*-5. More importantly, the unmodified VAE model does not correctly model the surrounding vehicles 1010 in the sampled goal sequences. As shown in FIGS. 10*c*-4 and 10*c*-5, the obstacle vehicles 1010 are almost ignored by the unmodified VAE. In contrast, the CVAE model synthesizes the surrounding agents' future locations in its sampled goals, which allows the high-level planner to gain insights about the surrounding vehicles. As a result, the planner equipped with the CVAE reaches a higher score of 61.6 than 57.4 of that with the VAE in the whole town map when trained using the expert demonstration.

Figure 11:
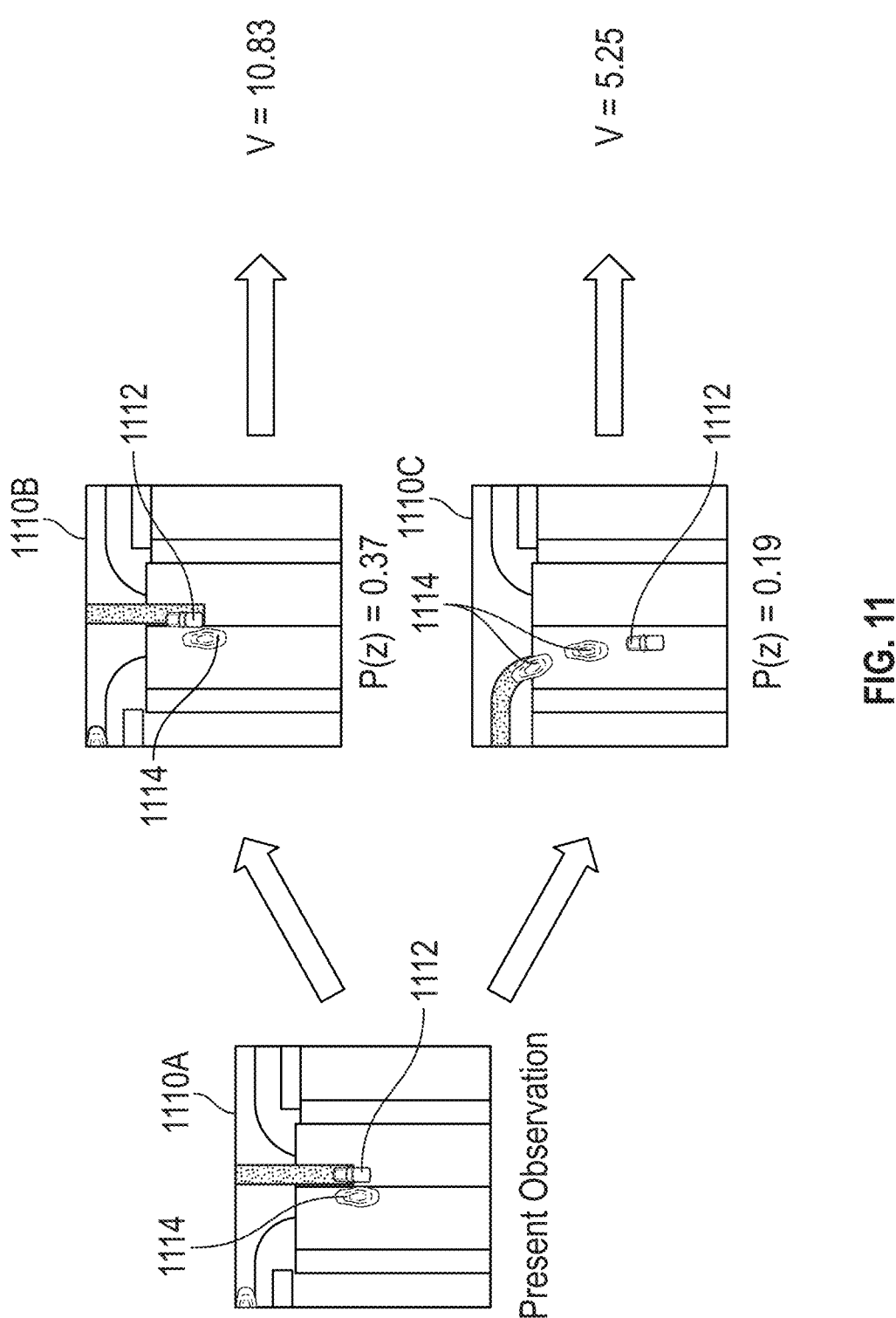
FIG. 11 illustrates a present observation image, a high-quality goal candidate with high latent probability, and a low-quality goal candidate with low latent probability in accordance with the present disclosure.

In FIG. 11, the present observation shows when the ego car 1112 enters an intersection. The two images in 1110B and 1110C are two samples of goal candidates when starting from the present observation in 1110A. The obstacle car 1114 should move down, but it should not be out of sight during the goal sampling period. Therefore, 1110B with the obstacle 1114 in sight is more reasonable than 1110C. Hence, 1110B should be assigned a higher value than 1110C. Also, 1110C is twisted and has plenty of noise. Compared with 1110B, it has lower probability in the latent space when it is encoded by the CVAE. A low probability means that the image is less likely to be a valid goal in the original image. As shown in FIG. 11, the estimated value of FIG. 1110B is 10.83 whereas 5.25 for 1110C. Hence, the learned value function can make reliable estimations on the quality of goal candidates.

In summary, a hierarchical planning framework through goal-conditioned offline reinforcement learning for tasks with extended temporal duration is shown. The low-level policy is trained by offline RL in a goal-conditioned setting, which controls the agent to achieve short-term sub-goals. The offline training is improved by a perturbed goal sampling process to deal with distributional shift. The high-level goal planner takes advantage of model-based methods by composing behavior and solves an optimization problem based on the low-level value function for long-term high-level planning strategy. The proposed framework is empirically proved to be more suitable for temporally extended tasks than regular offline RL without hierarchy. The offline training strategy improves the robustness to a distributional shift.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

As used herein, the phrase at least one of A, B, and C should be construed to mean a logical (A OR B OR C), using a non-exclusive logical OR. For example, the phrase at least one of A, B, and C should be construed to include any one of: (i) A alone; (ii) B alone; (iii) C alone; (iv) A and B together; (v) A and C together; (vi) B and C together; (vii) A, B, and C together. The phrase at least one of A, B, and C should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" or the term "controller" may refer to, be part of, or include processor hardware (shared, dedicated, or group) that executes code and memory hardware (shared, dedicated, or group) that stores code executed by the processor hardware.

The module or controller may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module or controller may communicate with other modules or controllers using the interface circuit(s). Although the module or controller may be depicted in the present disclosure as logically communicating directly with other modules or controllers, in various implementations the module or controller may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module or controller may be distributed among multiple modules that are connected via the communications system. For example, multiple modules may implement the same functionality distributed by a load balancing system. In a further example, the functionality of the module or controller may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules or controllers. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method comprising:

training a low-level policy to form a trained low-level policy and a low-level value function to form a trained goal conditioned value function, wherein training is performed using a static data set using goal conditioned episodes, said low-level value function comprising a reinforcement learning policy;

training a high-level goal planner having high level goals having high-level sub-goals corresponding to a plurality of future time steps using the low-level value function and using a conditional variable auto encoder to model transitions from one sub-goal to a next sub-goal so that sub-goal sequences can be sequentially reconstructed to maximize a cumulative reward over the sub-goals for the plurality of future time steps so that the sub-goals are reachable by the low-level policy;

obtaining an observation of a device;

generating an executable action using the low-level policy, the high-level goal planner and the observation; and operating the device with the executable action.

2. The method of claim 1 further comprising, prior to training the low-level policy, forming the goal-conditioned episodes using hindsight experience replay.

3. The method of claim 1 further comprising training the low-level policy using goal-conditioned episodes and out-of distribution goals by a perturbed goal sampling process.

4. The method of claim 1 wherein training the high-level goal planner comprises using Markov decision processes between sub-goals of consecutive sub-goals.

5. The method of claim 1 wherein the high-level goal planner is model-based comprising solving an optimization problem based on a low-level value function for a long-term strategy.

6. The method of claim 1 wherein generating the executable action comprises generating the executable action based on maximizing the value function.

7. The method of claim 1 wherein training the high-level planner comprises selecting one of the plurality of sub-goals of a sequence of subgoals at a second time step subsequent to a first time step.

8. The method of claim 1 wherein training the high-level goal planner comprises generating the high-level sub-goals comprising reachable goals based on a reward.

9. The method of claim 1 wherein training the low-level policy comprises training the low-level policy and value function.

10. The method of claim 1 wherein the sub-goals correspond to positions of an automotive vehicle and wherein operating the device comprises controlling a steering wheel angle of a vehicle, an acceleration of the vehicle, or both.

11. A system comprising a computer-readable medium storing computer-executable instructions that, when executed by a processor, configure the processor to:

train a low-level policy to form a trained low-level policy and a low-level value function to form a trained goal conditioned value function, wherein training is performed using a static data set using goal conditioned episodes, said low-level value function comprising a reinforcement learning policy;

train a high-level goal planner having high level goals having high-level sub-goals corresponding to a plurality of future time steps using the low-level value function and using a conditional variable auto encoder to model transitions from one sub-goal to a next sub-goal so that sub-goal sequences can be sequentially reconstructed to maximize a cumulative reward over the sub-goals for the plurality of future time steps so that the sub-goals are reachable by the low-level policy;

obtain an observation of a device;

generate an executable action using the observation, the low-level policy and the high-level goal planner; and operate the device with the executable action.

12. The system of claim 11 further comprising, prior to the processor configured to train the low-level policy, form goal-conditioned episodes from the static data set using hindsight experience replay.

13. The system of claim 11 further comprising training the low-level policy using goal-conditioned episodes and out-of distribution goals by a perturbed goal sampling process.

14. The system of claim 11 wherein the processor is configured to train the high-level goal planner using Markov decision processes between sub-goals of consecutive sub-goals.

15. The system of claim 11 wherein the high-level goal planner is model-based solves an optimization problem based on a low-level value function for a long-term strategy.

16. The system of claim 11 wherein the processor is further configured to generate the executable actions based on maximizing the value function.

17. The system of claim 11 wherein the processor is further configured to train the high-level planner by selecting one of the plurality of sub-goals of a sequence of subgoals at a second time step subsequent to a first time step.

18. The system of claim 11 wherein the processor is further configured to train the high-level goal planner by generating the high-level sub-goals comprising reachable goals based on a reward.

19. The system of claim 11 wherein the processor is further configured to train the low-level policy and value function.

20. The system of claim 11 wherein the sub-goals correspond to positions of an automotive vehicle and the processor is further configured to control a steering wheel angle of a vehicle, an acceleration of the vehicle, or both.

* * * * *